United States Patent
Zhou et al.

(10) Patent No.: US 9,042,894 B2
(45) Date of Patent: May 26, 2015

(54) UPLINK INTERFERENCE MITIGATION BY ADAPTING OPEN CELL TRANSMISSION POWER

(71) Applicant: QUALCOMM Incorporated, San Diego, CA (US)

(72) Inventors: Yan Zhou, San Diego, CA (US); Farhad Meshkati, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/788,877

(22) Filed: Mar. 7, 2013

(65) Prior Publication Data

US 2014/0256322 A1 Sep. 11, 2014

(51) Int. Cl.
*H04W 36/00* (2009.01)
*H04B 1/00* (2006.01)
*H04B 15/00* (2006.01)
*H04W 36/20* (2009.01)
*H04W 52/24* (2009.01)
*H04W 52/40* (2009.01)
*H04W 52/14* (2009.01)

(52) U.S. Cl.
CPC .......... *H04W 36/20* (2013.01); *H04W 52/143* (2013.01); *H04W 52/244* (2013.01); *H04W 52/40* (2013.01)

(58) Field of Classification Search
CPC ..... H04W 28/04; H04W 28/22; H04W 36/20; H04W 48/08; H04W 80/08; H04W 84/045
USPC ............... 455/436, 447, 422.1, 63.1; 370/237
See application file for complete search history.

(56) References Cited

U.S. PATENT DOCUMENTS

| | | | |
|---|---|---|---|
| 8,271,040 B2 | 9/2012 | Piercy et al. | |
| 2011/0021240 A1 | 1/2011 | Hiltunen et al. | |
| 2011/0319084 A1* | 12/2011 | Meshkati et al. | 455/436 |
| 2012/0028629 A1* | 2/2012 | Liu et al. | 455/422.1 |
| 2012/0046026 A1 | 2/2012 | Chande et al. | |
| 2012/0129527 A1* | 5/2012 | Takeuchi et al. | 455/436 |
| 2013/0143578 A1* | 6/2013 | Lekutai | 455/444 |

FOREIGN PATENT DOCUMENTS

EP 2456262 A1 5/2012

OTHER PUBLICATIONS

Motoki Morita, et al., "Adaptive Power Level Setting of Femtocell Base Stations for Mitigating Interference with Macrocells", Vehicular Technology Conference VTC 2010.
International Search Report and Written Opinion—PCT/US2014/019167—ISA/EPO—May 2, 2014.

* cited by examiner

*Primary Examiner* — Opiribo Georgewill
(74) *Attorney, Agent, or Firm* — Novak Druce Connolly Bove + Quigg LLP

(57) ABSTRACT

Methods and apparatus are disclosed for interference mitigation of an open-access node. The method includes determining, at the open-access node, whether uplink interference from a mobile entity is above a threshold. The method includes adjusting a transmission power to trigger a hand-in of the mobile entity in response to determining the uplink interference is above the threshold. The method includes handing-in the mobile entity from a first cell in response to adjusting the transmission power. The method includes redirecting the mobile entity to a second cell different from the first cell.

17 Claims, 9 Drawing Sheets

UPLINK INTERFERENCE MITIGATION BY ADAPTING OPEN CELL TRANSMISSION POWER

FIELD

The present disclosure relates generally to communication systems, and more specifically to techniques for deploying small-coverage base stations (e.g., femtocells).

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that may support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units or femto nodes, to be low-powered wireless access points that operate in licensed spectrum and are controlled by the network operator, may be connected with existing handsets, and use a residential digital subscriber line (DSL) or cable connection for backhaul. In various standards or contexts, a FAP may be referred to as a home node B (HNB), home e-node B (HeNB), access point base station, etc. With the increasing popularity of FAPs, there is a desire to address interference related to deployment of FAPs.

SUMMARY

Methods and apparatus for interference mitigation are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method of interference mitigation is disclosed. The method includes determining, at an open-access node, whether uplink interference from a mobile entity is above a threshold. The method includes adjusting a transmission power to trigger a hand-in of the mobile entity in response to determining the uplink interference is above the threshold. The method includes handing-in the mobile entity from a first cell in response to adjusting the transmission power. The method includes redirecting the mobile entity to a second cell different from the first cell.

In another aspect, an apparatus for interference mitigation includes at least one processor configured to: determine whether uplink interference from a mobile entity is above a threshold; adjust a transmission power to trigger a hand-in of the mobile entity in response to determining the uplink interference is above the threshold; hand-in the mobile entity from a first cell in response to adjusting the transmission power; and redirect the mobile entity to a second cell different from the first cell. The apparatus includes a memory coupled to the at least one processor for storing data.

In another aspect, an apparatus for interference mitigation includes means for determining whether uplink interference from a mobile entity is above a threshold. The apparatus includes means for adjusting a transmission power to trigger a hand-in of the mobile entity in response to determining the uplink interference is above the threshold. The apparatus includes means for handing-in the mobile entity from a first cell in response to adjusting the transmission power. The apparatus includes means for redirecting the mobile entity to a second cell different from the first cell.

In another aspect a computer program product includes a computer-readable medium including code for causing a computer to: determine, at an open-access node, whether uplink interference from a mobile entity is above a threshold; adjust a transmission power to trigger a hand-in of the mobile entity in response to determining the uplink interference is above the threshold; hand-in the mobile entity from a first cell in response to adjusting the transmission power; and redirect the mobile entity to a second cell different from the first cell.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
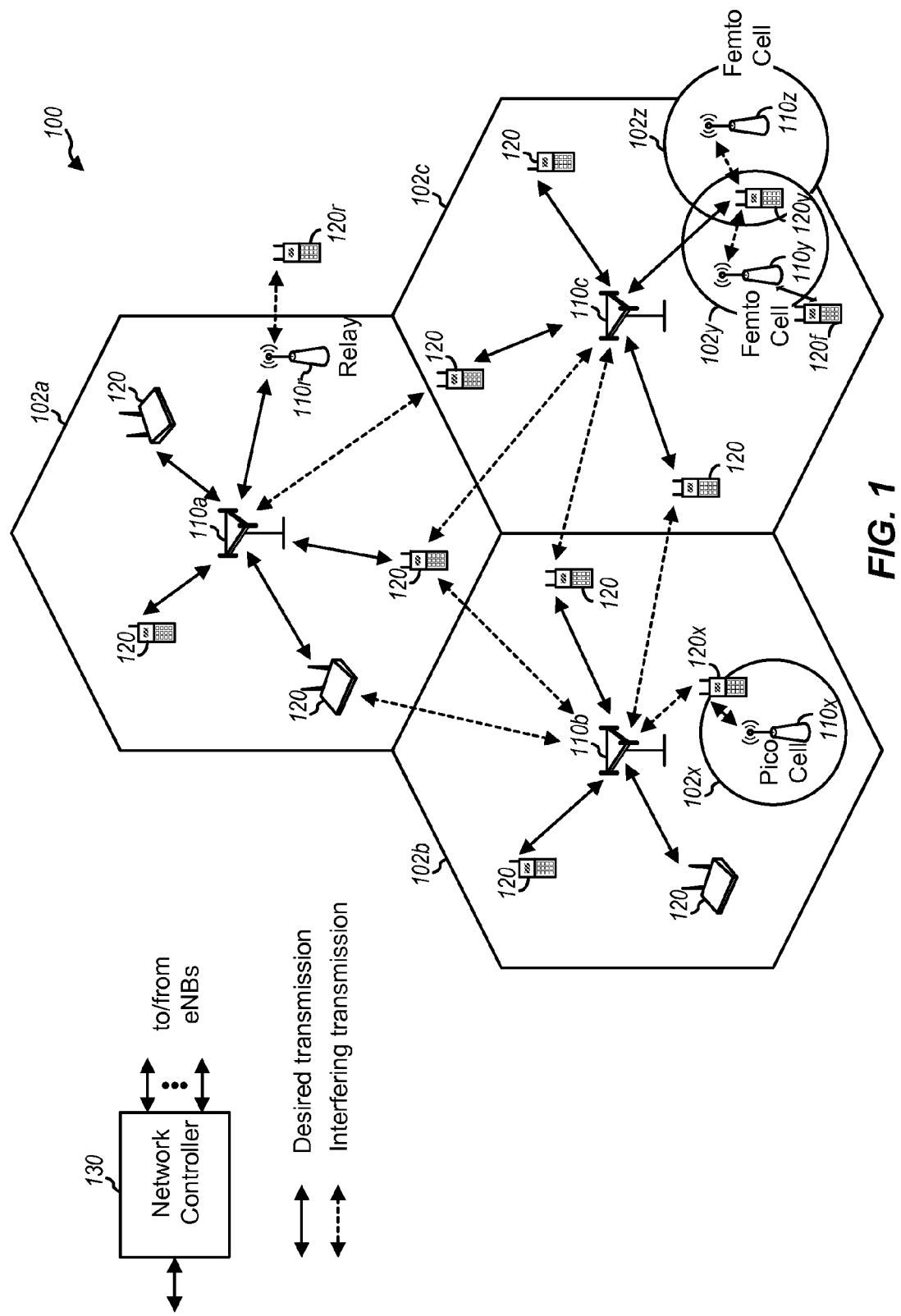
FIG. 1 is a block diagram conceptually illustrating an example of a telecommunications system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which may be a wired terminal or a wireless terminal. A terminal may also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100, which may be an LTE network, is illustrated in accordance with various embodiments presented herein. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" may refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For example, UE 120y may be in proximity to femto eNBs 110y, 110z. Uplink transmissions from UE 120y may interfere with femto eNBs 110y, 110z; uplink transmissions from UE 120y may jam femto eNBs 110y, 110z and degrade the quality of reception of other uplink signals to femto eNBs 110y, 110z. Femto eNB 110y may be an open-access femto eNB with no restricted associations to UEs. In one example femto eNB 110z may be a higher transmission power eNB initially deployed to provide coverage to an area. Femto eNB 110z may be deployed to cover a large service area. Femto eNB 110y may be a lower transmission power eNB deployed later than Femto eNB 110z to provide coverage for a hotspot area for loading traffic from either or both eNB 110c, eNB 110z. The uplink transmissions from UE 120y may interfere with transmissions from UE 120f and reduce the quality of service QoS experienced by UE 120f. Femto eNB 110y may seek to adapt its transmission power to mitigate interference in accordance with the methodology below.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
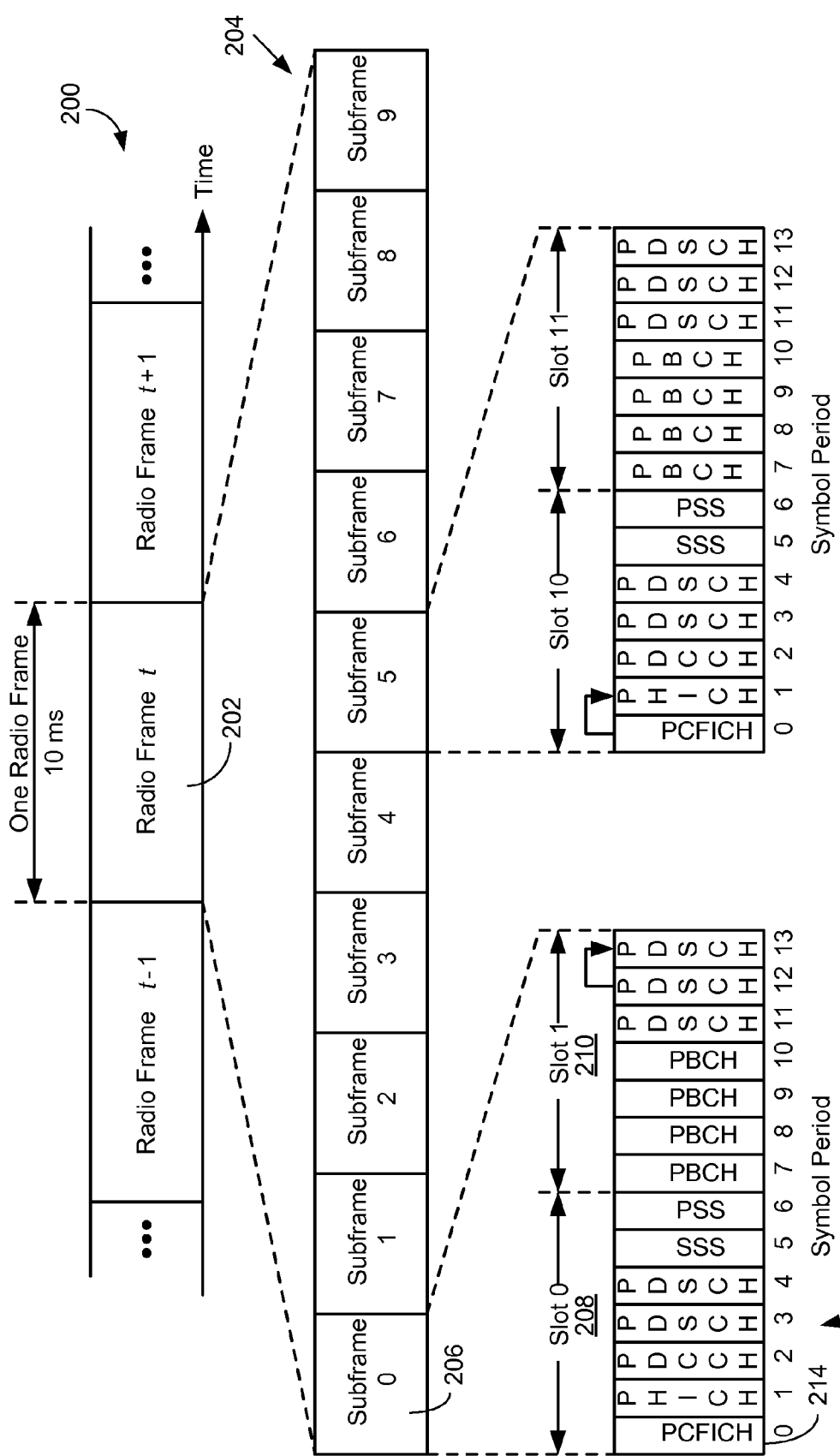
FIG. 2 is a block diagram conceptually illustrating an example of a down link frame structure in a telecommunications system.
Figure 6:
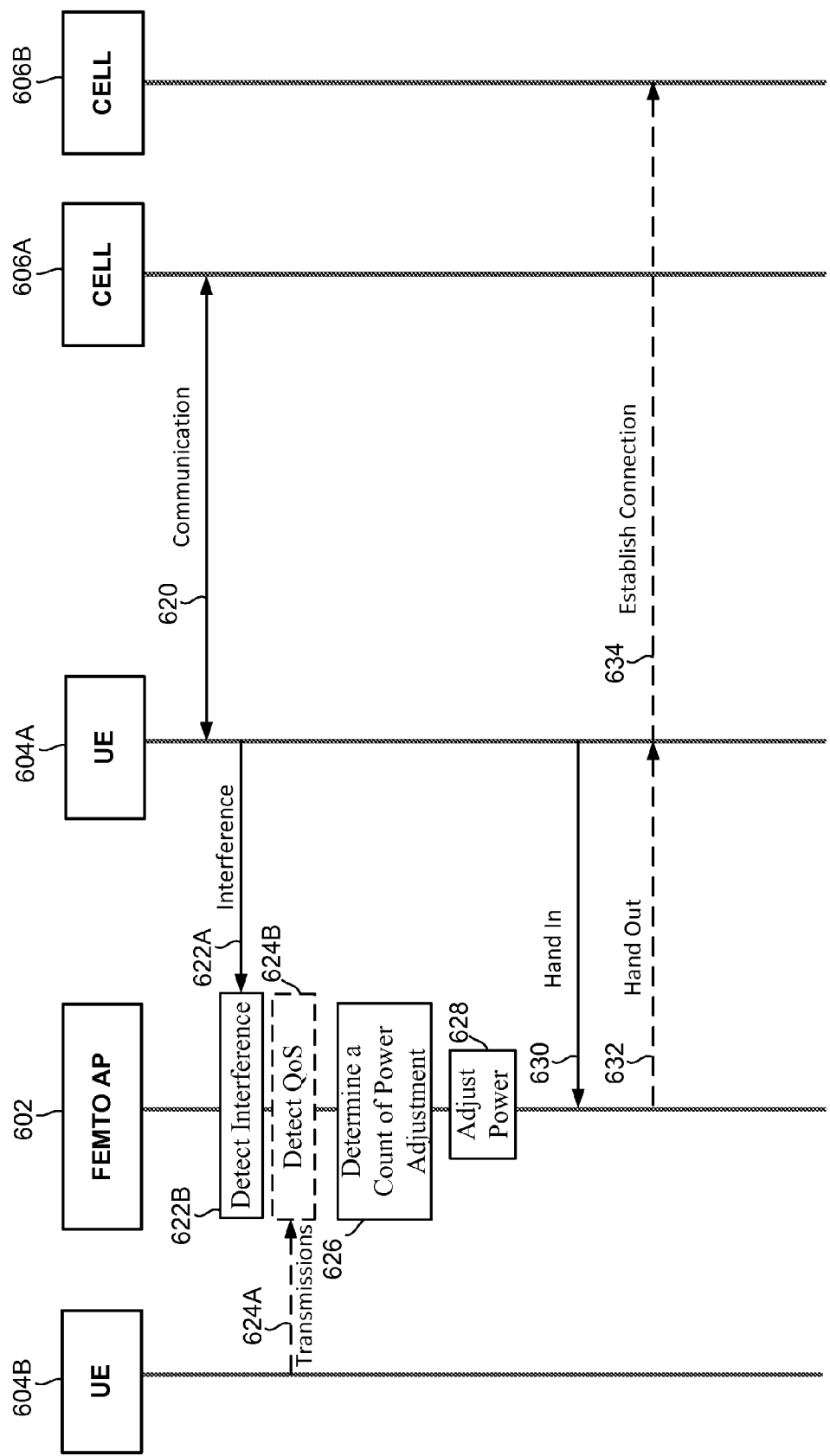
FIG. 6 is an example flow diagram illustrating aspects of interference mitigation.

FIG. 2 shows a downlink frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH may also be included in the first symbol period. Similarly, the PHICH and PDCCH may also both be in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
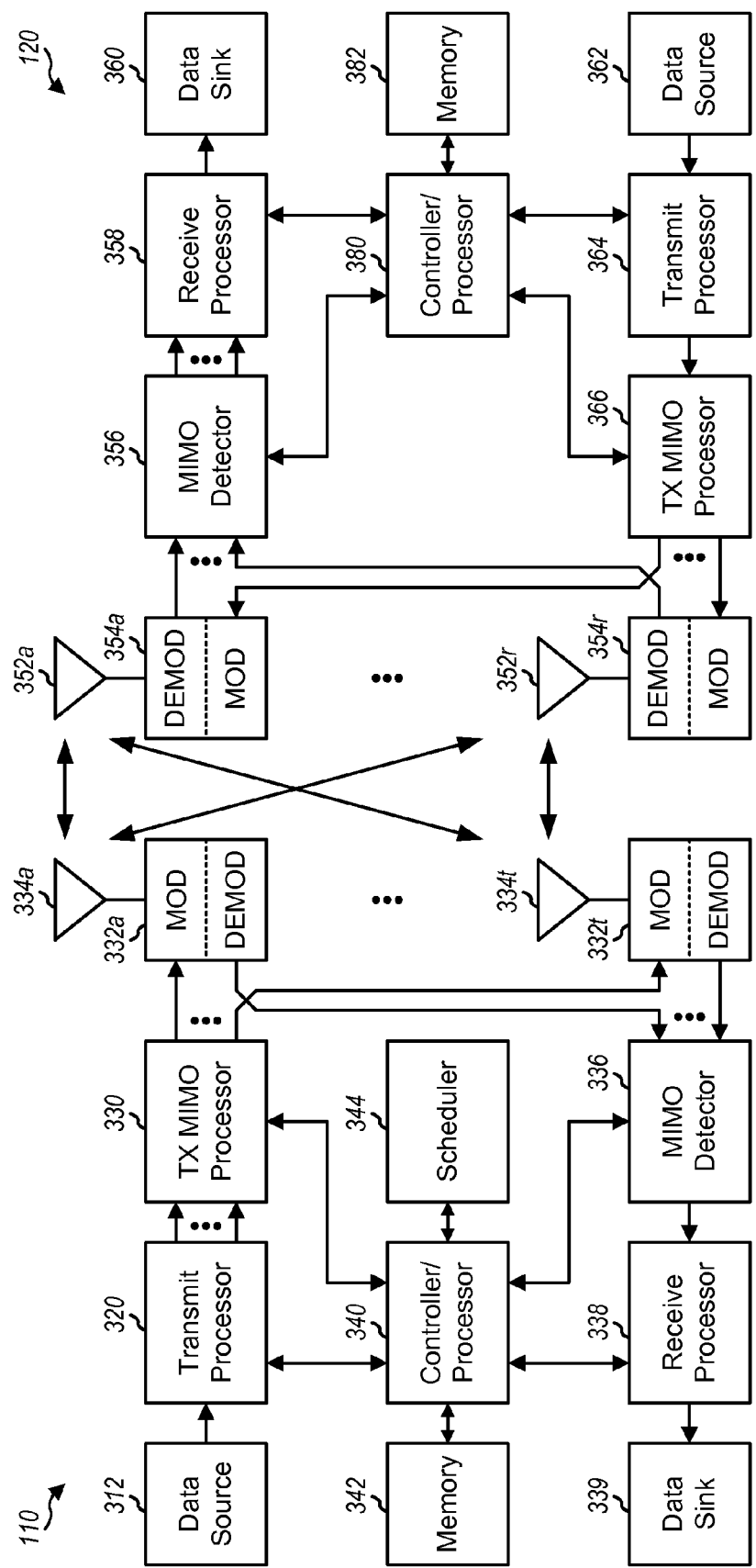
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
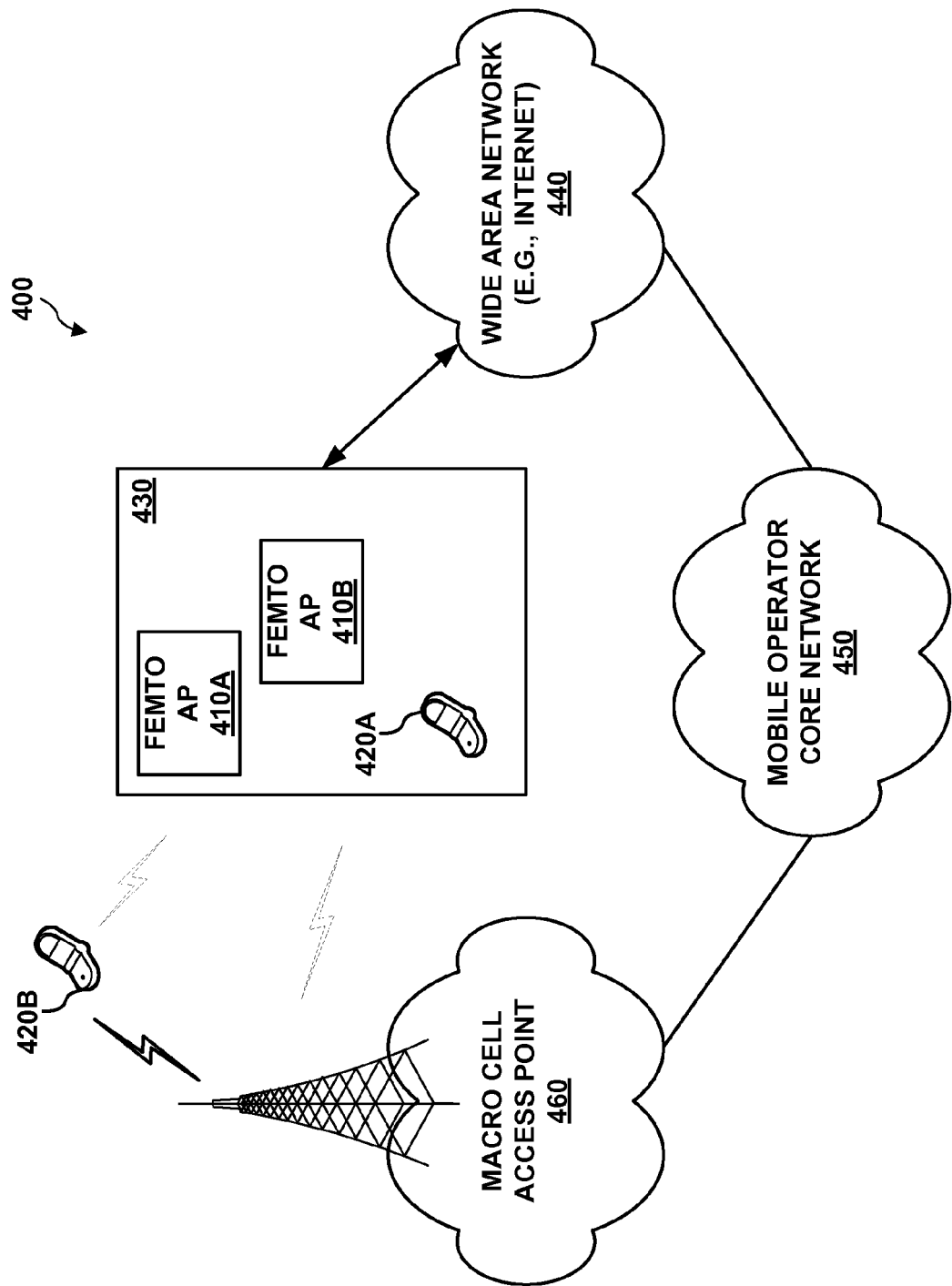
FIG. 4 is a block diagram illustrating another example communication system.

FIG. 4 illustrates an exemplary communication system 400 where one or more FAPs are deployed within a network environment. Specifically, the system 400 includes multiple FAPs 410A and 410B (e.g., FAPs or H(e)NB) installed in a relatively small scale network environment (e.g., in one or more user residences 430). Each FAP 410 may be coupled to a wide area network 440 (e.g., the Internet) and a mobile operator core network 450 via a digital subscriber line (DSL) router, a cable modem, a wireless link, or other connectivity means (not shown). As will be discussed below, each FAP 410 may be configured to serve associated access terminals 420 (e.g., access terminal 420A) and, optionally, alien access terminals 420 (e.g., access terminal 420B). In other words, access to FAPs 410 may be restricted such that a given access terminal 420 may be served by a set of designated (e.g., home) FAP(s) 410 but may not be served by any non-designated FAPs 410 (e.g., a neighbor's FAP).

Referring again to FIG. 4, the owner of a FAP 410 may subscribe to mobile service, such as, for example, 3G mobile service, offered through the mobile operator core network 450. In another example, the FAP 410 may be operated by the mobile operator core network 450 to expand coverage of the wireless network. In addition, an access terminal 420 may be capable of operating both in macro environments and in smaller scale (e.g., residential) network environments. Thus, for example, depending on the current location of the access terminal 420, the access terminal 420 may be served by a macro access point 460 or by any one of a set of FAPs 410 (e.g., the FAPs 410A and 410B that reside within a corresponding user residence 430). For example, when a subscriber is outside his home, he is served by a standard macro access point (e.g., node 460) and when the subscriber is at home, he is served by a FAP (e.g., node 410A). Here, it should be appreciated that a FAP 410 may be backward compatible with existing access terminals 420.

A FAP 410 may be deployed on a single frequency or, in the alternative, on multiple frequencies. Depending on the particular configuration, the single frequency or one or more of the multiple frequencies may overlap with one or more frequencies used by a macro access point (e.g., node 460). In some aspects, an access terminal 420 may be configured to connect to a preferred FAP (e.g., the home FAP of the access terminal 420) whenever such connectivity is possible. For example, whenever the access terminal 420 is within the user's residence 430, it may communicate with the home FAP 410.

In some aspects, if the access terminal 420 operates within the mobile operator core network 450 but is not residing on its most preferred network (e.g., as defined in a preferred roaming list), the access terminal 420 may continue to search for the most preferred network (e.g., FAP 410) using a Better System Reselection (BSR), which may involve a periodic scanning of available systems to determine whether better systems are currently available, and subsequent efforts to associate with such preferred systems. Using an acquisition table entry (e.g., in a preferred roaming list), in one example, the access terminal 420 may limit the search for specific band and channel. For example, the search for the most preferred system may be repeated periodically. Upon discovery of a preferred FAP, such as FAP 410, the access terminal 420 selects the FAP 410 for camping within its coverage area.

A FAP may be restricted in some aspects. For example, a given FAP may only provide certain services to certain access terminals. In deployments with so-called restricted (or closed) association, a given access terminal may only be served by the macro cell mobile network and a defined set of FAPs (e.g., the FAPs 410 that reside within the corresponding user residence 430). In some implementations, a FAP may be restricted to not provide, for at least one access terminal, at least one of: signaling, data access, registration, paging, or service.

In some aspects, a restricted FAP (which may also be referred to as a Closed Subscriber Group H(e)NB) is one that provides service to a restricted provisioned set of access terminals. This set may be temporarily or permanently extended as necessary. In some aspects, a Closed Subscriber Group (CSG) may be defined as the set of access nodes (e.g., FAPs) that share a common access control list of access terminals. A channel on which all FAPs (or all restricted FAPs) in a region operate may be referred to as a femto channel.

Various relationships may thus exist between a given FAP and a given access terminal. For example, from the perspective of an access terminal, an open FAP may refer to a FAP with no restricted association. A restricted FAP may refer to a FAP that is restricted in some manner (e.g., restricted for association and/or registration). A home FAP may refer to a FAP on which the access terminal is authorized to access and operate on. A guest FAP may refer to a FAP on which an access terminal is temporarily authorized to access or operate on. An alien FAP may refer to a FAP on which the access terminal is not authorized to access or operate on, except for perhaps emergency situations (e.g., 911 calls).

From a restricted FAP perspective, a home access terminal may refer to an access terminal that authorized to access the restricted FAP. A guest access terminal may refer to an access terminal with temporary access to the restricted FAP. An alien access terminal may refer to an access terminal that does not have permission to access the restricted FAP, except for perhaps emergency situations, for example, 911 calls (e.g., an access terminal that does not have the credentials or permission to register with the restricted FAP).

For convenience, the disclosure herein describes various functionality in the context of a FAP. It should be appreciated, however, that a pico node may provide the same or similar functionality as a FAP, but for a larger coverage area. For example, a pico node may be restricted; a home pico node may be defined for a given access terminal, and so on.

In accordance with one or more embodiments of the present disclosure, there are provided techniques for mitigating interference by adapting transmission power of an open-access node, such as an open-access FAP, etc. The transmission power may be adapted based on interference from a nearby UE.

An open-access FAP with lower transmission power may experience interference by a UE served by a neighboring cell with higher transmission power. The neighboring cell may be a femtocell, picocell, macrocell, etc. For example, when the UE served by the neighboring cell is at the cell edge of the FAP, the uplink transmissions from the UE may affect the FAP. UEs served by the FAP with lower transmission power may have poorer quality of service (QoS) due to high bursty interference caused by the neighboring UEs.

Once the FAP is affected by the high uplink interference from the neighboring UEs, the FAP may adapt its transmission power to absorb and handout the interfering UE. The FAP may adapt its transmission power in the short-term or long-term. For example, in case of adapting the FAP's transmission power in the short-term, the FAP may absorb (or hand-in) the UE and then hand-out the UE to another cell that may not interfere with the FAP. As another example, in case of adapting the FAP's transmission power in the long-term, the FAP may absorb and serve the UE without handing out the UE to another cell.

For example, the FAP may absorb the UE connected to a higher power femtocell. The higher power femtocell may be operating on shared channel, etc. If the FAP is frequently affected by high uplink interference, then the FAP may adapt transmission power in the long-term to absorb interfering UEs.

Figure 5:
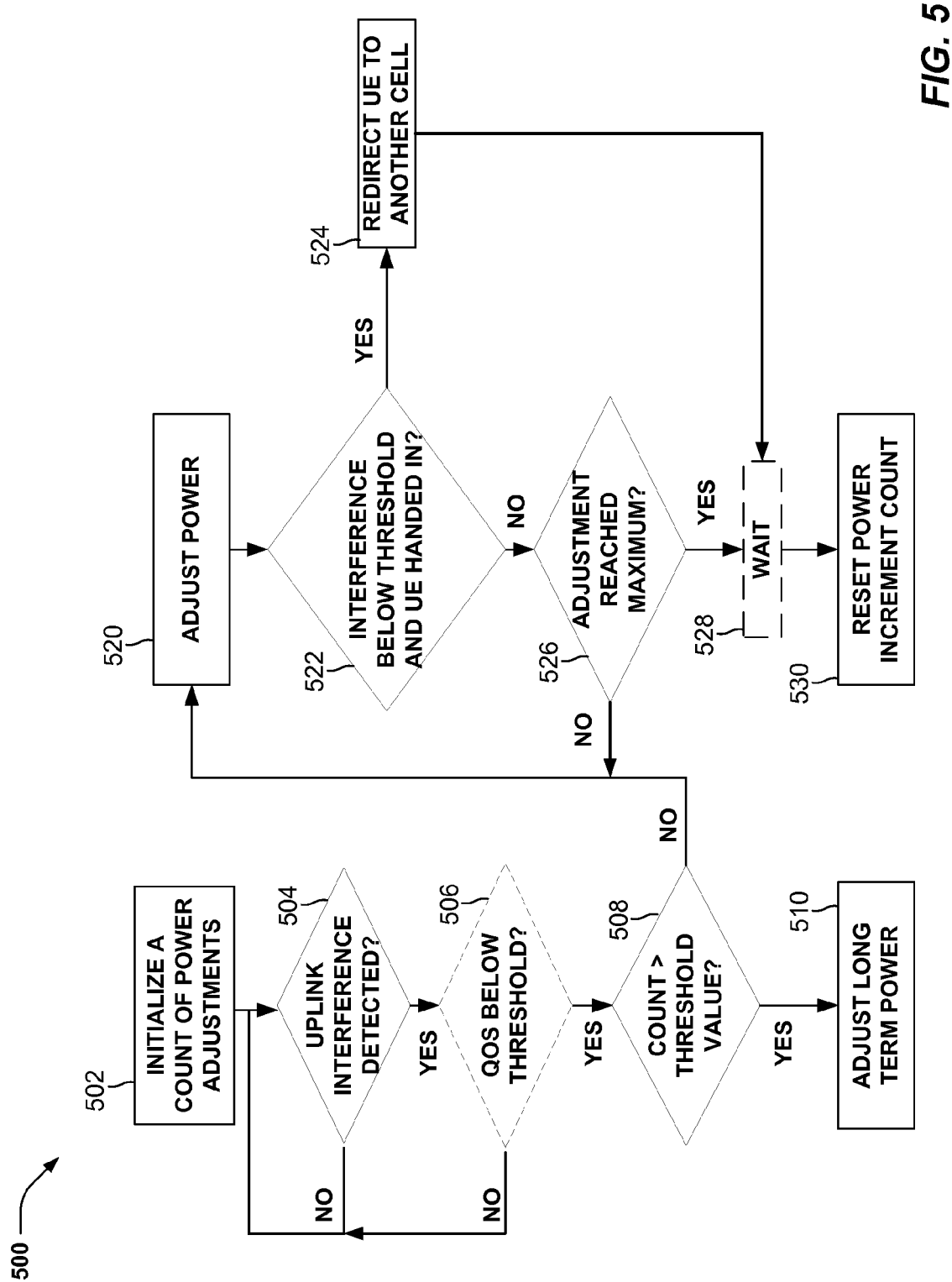
FIG. 5 is an example flow chart illustrating interference mitigation based on power adaptation.

FIG. 5 is an example flow chart of a method illustrating interference mitigation based on power adaptation. The method may be performed by an open-access node, such as an open-access FAP. The method includes initializing a count of power adjustments at step 502. The power adjustments may be a transmission power adjustment. The transmission power may include a common pilot channel power (CPICH). The method may include storing a count or number of times the method has performed power adjustments to determine whether to make a short-term power adjustment or a long-term power adjustment. Short-term power adjustments may be beneficial to infrequent interference from UEs. A long-term power adjustment may be beneficial for frequent interference from UEs. In the case of long-term power adjustments, the power adjustment may be a permanent power adjustment. At step 504, the method may determine whether uplink interference has been detected. For example, the method may detect uplink interference from UEs served by neighboring cells, such as femtocells, picocells, macrocells, etc. If uplink interference has not been detected, the method may continue back to step 504 to detect interference. If uplink interference has been detected, the process may continue to step 506, or to step 508 if the step 506 is optional. At step 506, the method may determine a quality of service (QoS) for served UEs at step 506. Additionally or alternatively, the method may determine metrics including a frame rate of error, throughput, packet delay, etc. from the served UEs. Step 506 may be optionally performed. If the QoS (or other metrics) is above a threshold, e.g., acceptable reception quality from UEs, then the FAP may return to step 504 to detect interference. If the QoS is below a threshold, e.g., poor reception quality from UEs, then the method may determine to adjust or adapt transmission power to mitigate the interference. At step 508, the method may determine whether the count of previous transmission power adjustments is above a threshold. If the count of the power adjustments is above the threshold, indicating frequent power adjustments, the method may perform a long-term power adjustment. The long-term power adjustment may be a permanent power adjustment. If the count of the power adjustments is below the threshold, the method may determine to perform short-term power adjustment at step 520. At step 520, the method performs power adjustment. The power adjustment may be an incremental or gradual power adjustment. The gradual power adjustment may prevent disconnecting UEs due to a sudden rise in downlink interference. The gradual power adjustment may be based on feedback from steps 522 and 526. At step 522, the method determines whether interference is below a threshold and whether a UE has been handed in. The interference may be an out of cell uplink interference. If interference is below a threshold and a UE has been handed in, then the method proceeds to step 524. At step 524 the method may redirect the UE to another cell. For example, the method may redirect the UE to a macrocell that operates on a different channel to mitigate interference. The redirection information with a suggested cell may be sent to the UE upon rejecting the UE's connection request or releasing the UE's connection if a connection with the UE has been established. After the UE has been redirected at step 524, the method proceeds to step 528. Returning to step 522, if the interference is above the threshold or a UE has not been handed in, then the method may proceed to step 526. At step 526, the method determines whether the adjustment has reached a maximum power. If the maximum power has not been reached, the method returns to step 520 for power adjustment. If the maximum power has been reached, then the method may no longer increase the power. In such instance, the method proceeds to step 528. At step 528, the method may optionally wait before proceeding for the power adjustment to settle. The method proceeds to step 530 where the power may be reset. For example, the power may be reset to the original value before the start of the method 500. At step 530, the method may increment the count of the power adjustments. The method may return to step 504 to detect interference or terminate. The thresholds may be preconfigured or received from the network.

FIG. 6 is an example flow diagram for mitigating interference, for example, based on the method of FIG. 5. At step 620, a FAP 602 may detect interference 622A from a UE 604A. For example, the UE 604A may be in communication with a cell 606A. The cell 606A may be a femtocell, picocell, macrocell, etc. The cell 606A may be a higher powered cell, and FAP 602 may be a lower powered cell. The FAP 602 may determine a count of power adjustments, e.g., power adjustments over a period of time (e.g., a day, a week, etc.). Based on the power adjustment count, the FAP 602 may determine one of a short-term or long-term power adjustment. For the count below a threshold, the FAP 602 may adjust based on a short-term power adjustment. For the count above a threshold, the FAP 602 may adjust based on a long-term power adjustment.

At step 622B, the FAP 602 may detect interference 622A from the UE 604A served by the neighboring cell 606A. The FAP 602 may optionally detect a QoS of UE(s) 604B served by the FAP 602 based on transmissions 624A, at step 622B. In another aspect the FAP 602 may determine a metric such as a frame rate of error, throughput, packet delay, etc. from the served UE(s) 604B. Based on the detected interference 622A, and optionally the QoS or other metric, the FAP 602 may determine to adjust transmission power. At step 626, the FAP 602 may determine a count of power adjustments. In the case of infrequent power adjustments, the FAP 602 may determine to adjust based on a short-term power adjustment at step 628. In the case of frequent power adjustments, the FAP 602 may determine to adjust based on a long-term power adjustment at step 628. At step 630, the UE 604A may be handed into the FAP 602. In the case of short-term power adjustment, the FAP 602 may return to operations at the original or normal transmission power. The FAP 602 may hand out the UE to a different cell 606B than the cell 606A that the UE 604A was originally connected to. At step 632, the FAP 602 may hand out the UE 604A to the different cell 606B. The UE 604A may establish a connection with the other cell 606B at step 634. For example, the UE 604A may be connected to a femtocell 606A operating on a shared or same channel as the FAP 602. The transmissions between UE 604A and cell 606A may interfere with FAP 602 because of transmissions on the shared or same channel. The FAP 602 may hand out the UE 604A to a macrocell 606B that operates on a different channel. Handing out the UE 604A to a different cell 606B mitigates interference.

In an example, the UE 604A may be a user that has moved into the coverage area of both the cell 606A and FAP 602. A user associated with the UE 604A is in this location (e.g., a hotspot area) often. The UE 604A connects to the cell 606A at step 620. The FAP 602 has previously detected interference at this location twice per hour, from the UE 604A and other UEs. At step 622B, the FAP 602 detects interference 622A from UE 604A. At step 626, the FAP 602 determines that there has been fifteen occurrences of interference. The FAP 602 was configured with a threshold of fourteen times as a threshold for power adjustment. Based on the determined number of interference, the FAP 602 makes a determination to adjust power for the long-term, at step 628. At step 630, the FAP 602 receives a hand in of the UE 604A based on the power adjustment. If the UE 604A leaves the area and then returns, the UE 604A may connect to the FAP 602 rather than the cell 606A because the service area of FAP 602 has increased. Because the UE 604A connects to the FAP 602, potential interference from the UE 604A may be eliminated.

In another example, the UE 604A may be a user that has moved into the coverage area of both the cell 606A and FAP 602. A user associated with the UE 604A is in this location (e.g., an office area) only once. The UE 604A connects to the cell 606A at step 620. The FAP 602 has previously detected interference at this location only once, from another UE. At step 622B, the FAP 602 detects interference 622A from UE 604A. At step 626, the FAP 602 determines that there has been one occurrence of interference. The FAP 602 was configured with a threshold of fourteen times as a threshold for power adjustment. Based on the determined number of interference occurrences, the FAP 602 makes a determination to adjust power for the short-term, at step 628. At step 630, the FAP 602 receives a hand in of the UE based on the power adjustment. The FAP 602 then hands out the UE 604A to a macrocell 606B. The macrocell 606B operates on a different channel, and the interference from the UE 604A is mitigated.

Figure 7:
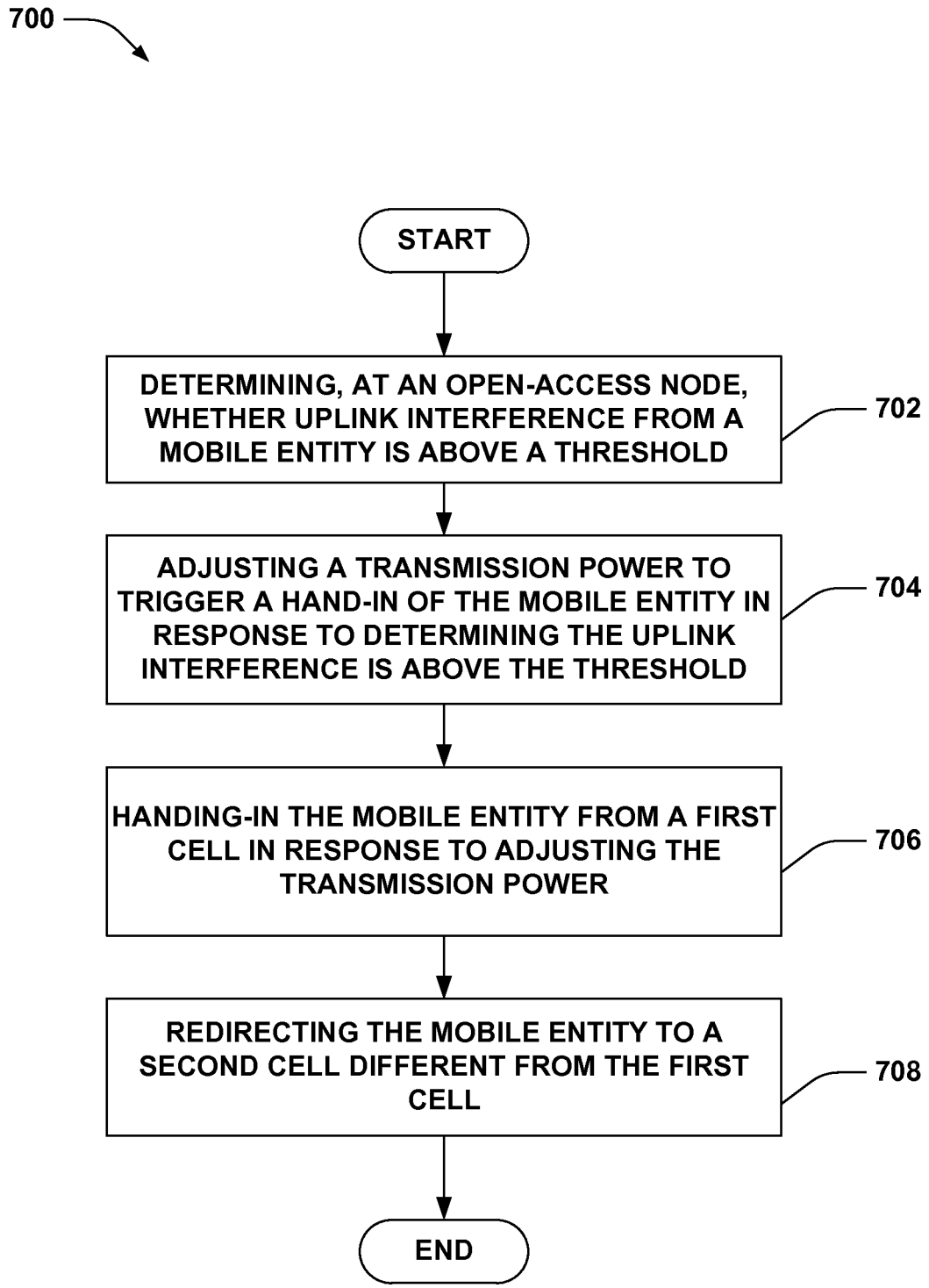
FIG. 7 illustrates aspects of a methodology for interference mitigation by a network node.

In accordance with one or more aspects of the embodiments described herein, with reference to FIG. 7, there is shown a methodology 700, operable by an open-access node, such as, for example, an open-access femto AP, or the like. Specifically, method 700 describes a way to mitigate interference at the access point. The method 700 may involve, at 702, determining, at an open-access node, whether uplink interference from a mobile entity is above a threshold. The method 700 may involve, at 704, adjusting a transmission power to trigger a hand-in of the mobile entity in response to determining the uplink interference is above the threshold. The method 700 may involve, at 706, handing-in the mobile entity from a first cell in response to adjusting the transmission power. The method 700 may involve, at 708, redirecting the mobile entity to a second cell different from the first cell.

The uplink first cell may be a femtocell, picocell, macrocell, etc. The second cell may be a femtocell, picocell, macrocell, etc. The transmission power may include a common pilot channel (CPICH) power.

Figure 8:
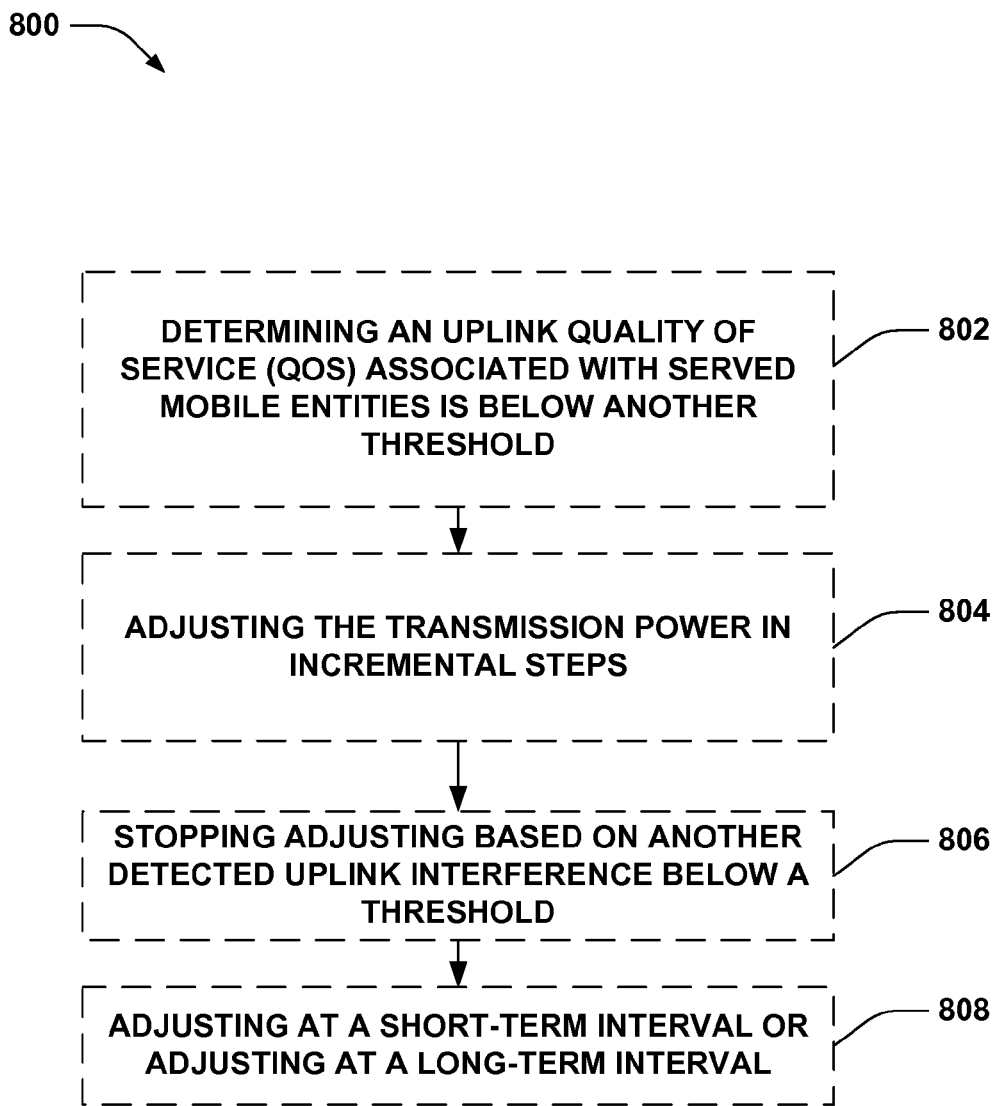
FIG. 8 illustrates other aspects of the methodology for interference mitigation by a network node.

With reference to FIG. 8, there is shown further operations 800 or aspects of the method 700 that are optional and may be performed by an access node or the like. If the method 800 includes at least one block of FIG. 8, then the method 800 may terminate after the at least one block, without necessarily having to include any subsequent downstream block(s) that may be illustrated. It is further noted that numbers of the blocks do not imply a particular order in which the blocks may be performed according to the method 800. For example, the method 800 may further involve, at 802, determining an uplink quality of service (QoS) associated with served mobile entities is below another threshold. For example, step 804, adjusting the transmission power may be based on determining the uplink QoS. The method 800 may further involve, at 804, adjusting the transmission power in incremental steps. For example, the transmission power may be adjusted in incremental steps or gradually increased to prevent call drops from the served UEs due to a sudden rise of downlink interference. The method 800 may further involve, at 806, stopping adjusting based on another detected uplink interference below a threshold. For example, if the UE has moved out of the area or disconnected to the serving cell, then the femtocell may detect a lower uplink interference. If the femtocell detects interference, e.g., below a threshold, the femtocell may stop adjusting the transmission power or return the transmission power to the original value. The method 800 may further involve, at 808, adjusting at a short-term interval or adjusting at a long-term interval. For example, the adjustment for short-term or long-term may be based on a frequency of previous power adjustments. Short-term power adjustment may be suitable for infrequent power adjustments. Long term power adjustments may be suitable if the femtocell required frequent power adjustments.

Figure 9:
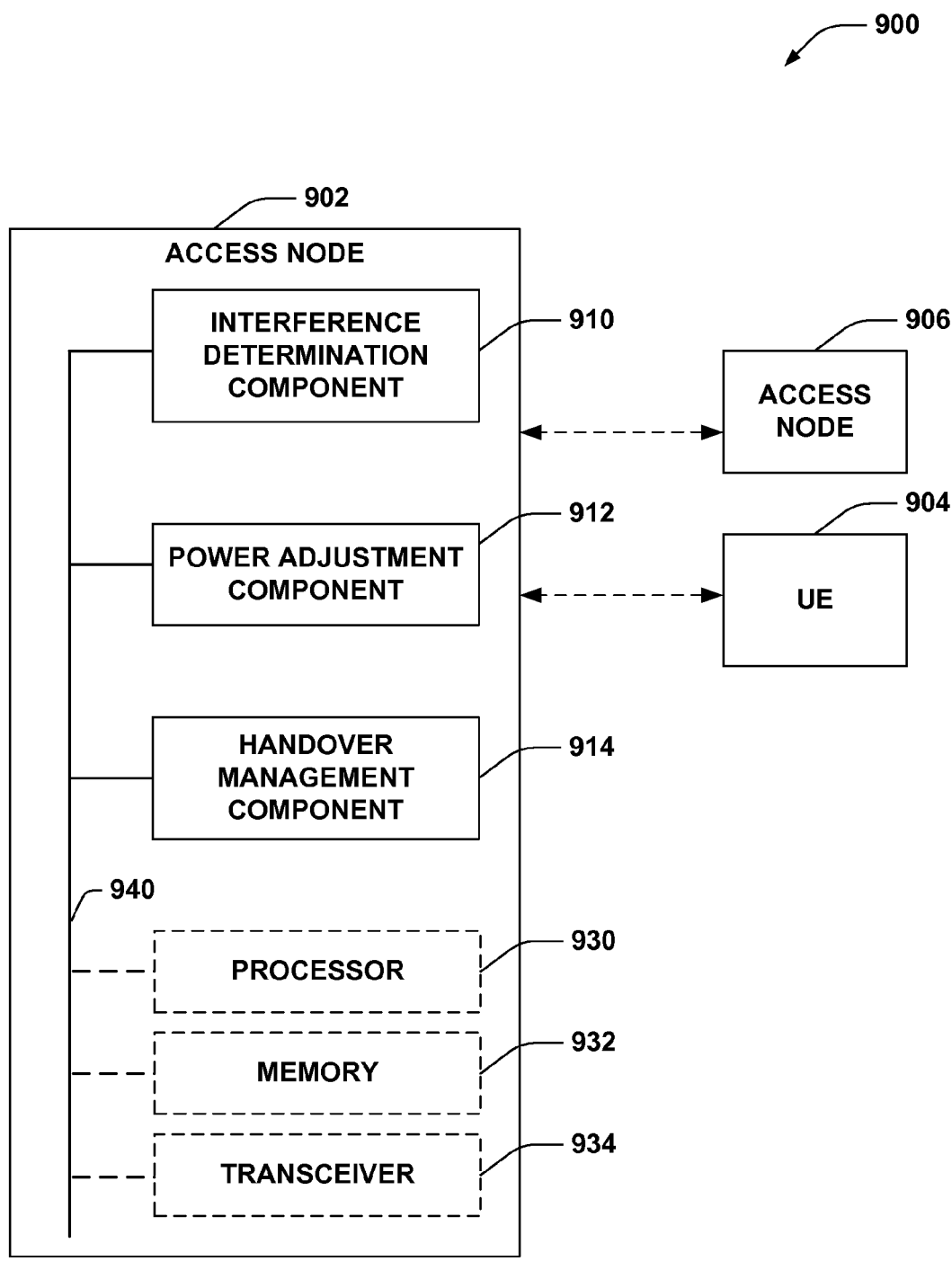
FIG. 9 shows an embodiment of an apparatus for interference mitigation, in accordance with the methodologies of FIGS. 7-8.

With reference to FIG. 9, there is provided an exemplary apparatus 902 that may be configured as an access node (e.g., an open-access node, open-access femto AP, etc.) in a wireless system 900, or as a processor or similar device/component for use within the apparatus. The apparatus 902 may include functional blocks that may represent functions implemented by a processor, software, or combination thereof (e.g., firmware). For example, apparatus 902 may include an interference determination component 910 for determining whether uplink interference from a mobile entity is above a threshold. The interference determination component 910 may be configured for determining whether an uplink quality of service (QoS) associated with served mobile entities is below another threshold. The interference determination component 910 may be, or may include, a means for determining whether uplink interference from a mobile entity is above a threshold. The interference determination component 910 may be, or may include, a means for determining an uplink quality of service (QoS) associated with served mobile entities is below another threshold. Said means may include an algorithm executed by one or more processors, or one or more processors coupled to a transceiver. The algorithm may include, for example, one or more of algorithms 702 and 802 described above in connection with FIGS. 7-8.

For example, apparatus 902 may include a power adjustment component 912 for adjusting a transmission power to trigger a hand-in of the mobile entity in response to determining the uplink interference is above the threshold. The power adjustment component 912 may be configured for adjusting the transmission power in incremental steps. The power adjustment component 912 may be configured for stopping adjusting based on another detected uplink interference below a threshold. The power adjustment component 912 may be configured for adjusting at a short-term interval or adjusting at a long-term interval. The power adjustment component 912 may be, or may include, means for adjusting a transmission power to trigger a hand-in of the mobile entity in response to determining the uplink interference is above the threshold. The power adjustment component 912 may be, or may include, means for adjusting the transmission power in incremental steps. The power adjustment component 912 may be, or may include, means for stopping adjusting based on another detected uplink interference below a threshold. The power adjustment component 912 may be, or may include, adjusting at a short-term interval or adjusting at a long-term interval. Said means may include an algorithm executed by one or more processors. The algorithm may include, for example, one or more of algorithms 704, 804, 806, or 808 described above in connection with FIGS. 7-8.

The apparatus 902 may include a handover management component 914 for handing-in the mobile entity from a first cell in response to adjusting the transmission power. The handover management component 914 may be configured for redirecting the mobile entity to a second cell different from the first cell. The handover management component 914 may be, or may include, means for handing-in the mobile entity from a first cell in response to adjusting the transmission power. The handover management component 914 may be, or may include, means for redirecting the mobile entity to a second cell different from the first cell. Said means may include an algorithm executed by one or more processors, or one or more processors coupled to a transceiver. The algorithm may include, for example, one or more of algorithms 706, 708 described above in connection with FIG. 7.

Additionally, the apparatus 902 may include a memory 932 that retains instructions for executing functions associated with the components 910-914. While shown as being external to memory 932, it is to be understood that one or more of the components 910-914 may exist within memory 932. In one example, components 910-914 may comprise at least one processor, or each component 910-914 may be a corresponding module of at least one processor. Moreover, in an additional or alternative example, components 910-914 may be a computer program product comprising a computer readable medium, where each component 910-914 may be corresponding code.

In related aspects, the apparatus 902 may optionally include a processor component 930 having at least one processor. The processor 930, in such case, may be in operative communication with the components 910-914 via a bus 940 or similar communication coupling. The processor 930 may effect initiation and scheduling of the processes or functions performed by components 910-914.

In further related aspects, the apparatus 902 may include a radio transceiver component 934. A stand-alone receiver and/or stand-alone transmitter may be used in lieu of or in conjunction with the transceiver component 934. The radio transceiver component 934 may be configured for connecting to one or more communication devices, such as access node 906 or UE 904. The apparatus 902 may also include a network interface (not shown) for connecting to one or more network entities, such as access node 906.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of interference mitigation, the method comprising:
   determining, at an open-access node, whether uplink interference from a mobile entity is above a threshold;
   adjusting a transmission power incrementally to trigger a hand-in of the mobile entity in response to determining the uplink interference is above the threshold, wherein each increment is based on a measured thermal noise level and a measured uplink out-of-cell interference level;
   handing-in the mobile entity from a first cell in response to adjusting the transmission power; and
   redirecting the mobile entity to a second cell different from the first cell.

2. The method of claim 1, wherein the adjusting the transmission power is further based on determining an uplink quality of service (QoS) associated with served mobile entities is below another threshold.

3. The method of claim 2, wherein the uplink QoS is further determined based on at least one of a frame error rate (FER), throughput, packet delay, transmit power, signal to interference plus noise ratio in uplink transmission of each served mobile entity.

4. The method of claim 1, wherein the second cell comprises a macro cell.

5. The method of claim 1, further comprising stopping the adjusting based on another detected uplink interference below the threshold.

6. The method of claim 2, wherein the adjusting comprises at least one of adjusting at a short-term interval or adjusting at a long-term interval.

7. The method of claim 6, wherein the long-term interval adjustment comprises incremental adjustments based on at least one of (i) a frequency of the short-term interval adjustment exceeding a second threshold or (ii) an absolute transmit power difference between the open-access node and a neighboring node being within a third threshold.

8. The method of claim 1, wherein the transmission power comprises a common pilot channel (CPICH) power.

9. An apparatus for interference mitigation, the apparatus comprising:
   at least one processor configured to: determine whether uplink interference from a mobile entity is above a threshold; adjust a transmission power incrementally to trigger a hand-in of the mobile entity in response to determining the uplink interference is above the threshold, wherein each increment is based on a measured thermal noise level and a measured uplink out-of-cell interference level; hand-in the mobile entity from a first cell in response to adjusting the transmission power; and redirect the mobile entity to a second cell different from the first cell; and
   a memory coupled to the at least one processor for storing data.

10. The apparatus of claim 9, wherein the at least one processor is configured to adjust the transmission power based on an uplink quality of service (QoS) associated with served mobile entities determined to be below another threshold.

11. The apparatus of claim 10, wherein the uplink QoS is further determined based on at least one of a frame error rate (FER), throughput, packet delay, transmit power, signal to interference plus noise ratio in uplink transmission of each served mobile entity.

12. An apparatus for interference mitigation, the apparatus comprising:
   means for determining whether uplink interference from a mobile entity is above a threshold;
   means for adjusting a transmission power incremental to trigger a hand-in of the mobile entity in response to determining the uplink interference is above the threshold, wherein each increment is based on a measured thermal noise level and a measured uplink out-of-cell interference level;
   means for handing-in the mobile entity from a first cell in response to adjusting the transmission power; and
   means for redirecting the mobile entity to a second cell different from the first cell.

13. The apparatus of claim 12, further comprising means for determining an uplink quality of service (QoS) associated with served mobile entities is below another threshold to adjust the transmission power.

14. The apparatus of claim 13, wherein the uplink QoS is further determined based on at least one of a frame error rate (FER), throughput, packet delay, transmit power, signal to interference plus noise ratio in uplink transmission of each served mobile entity.

15. A non-transitory computer-readable medium, comprising:
   code for causing a computer to:
      determine, at an open-access node, whether uplink interference from a mobile entity is above a threshold;
      adjust a transmission power to trigger incrementally a hand-in of the mobile entity in response to determining the uplink interference is above the threshold, wherein each increment is based on a measured thermal noise level and a measured uplink out-of-cell interference level;
      hand-in the mobile entity from a first cell in response to adjusting the transmission power; and
      redirect the mobile entity to a second cell different from the first cell.

16. The non-transitory computer-readable medium of claim 15, wherein the code further causes the computer to determine an uplink quality of service (QoS) associated with served mobile entities is below another threshold for adjusting the transmission power.

17. The non-transitory computer-readable medium of claim 16, wherein the uplink QoS is further determined based on at least one of a frame error rate (FER), throughput, packet delay, transmit power, signal to interference plus noise ratio in uplink transmission of each served mobile entity.

* * * * *